Feb. 5, 1929.

R. TITMAN 1,700,863

CARBURETOR

Filed March 10, 1922   2 Sheets-Sheet 1

Inventor
Russell Titman,
By his Attorney,
Henry J. Lueke.

Feb. 5, 1929.  1,700,863
R. TITMAN
CARBURETOR
Filed March 10, 1922  2 Sheets-Sheet 2
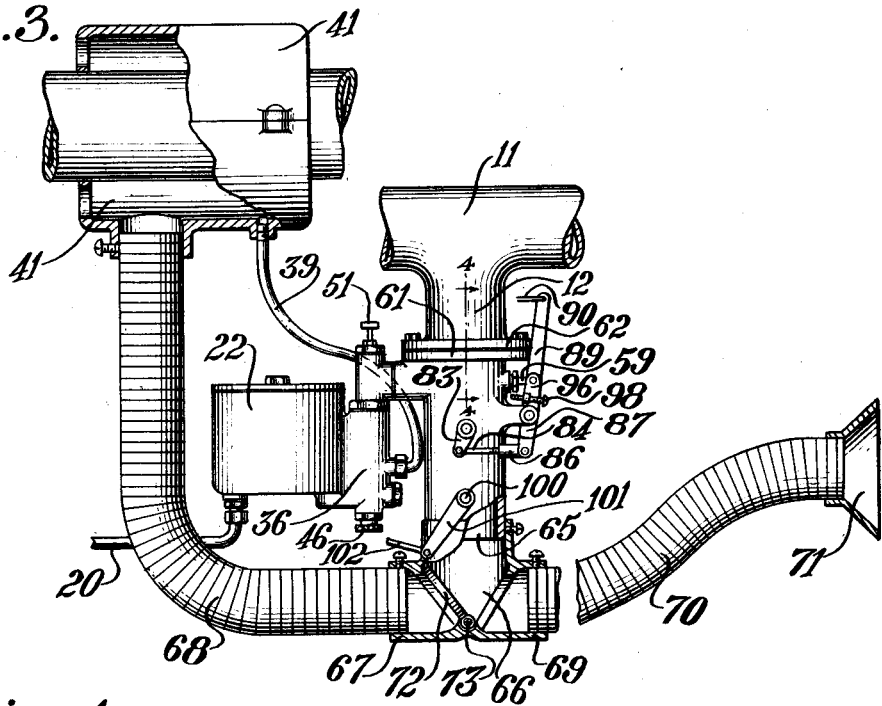
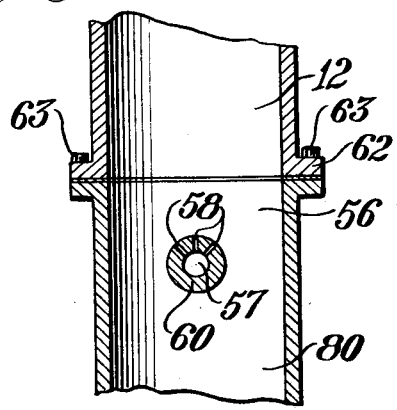
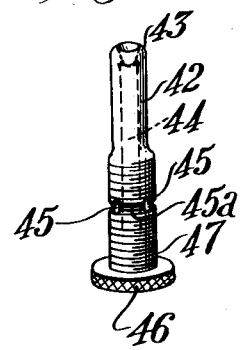
Inventor,
Russell Titman,
By his Attorney,
Henry J. Lucke.

Patented Feb. 5, 1929.

1,700,863

UNITED STATES PATENT OFFICE.

RUSSELL TITMAN, OF RAHWAY, NEW JERSEY, ASSIGNOR TO TITMAN CARBURETOR & MOTOR DEVICES COMPANY, A CORPORATION OF NEW JERSEY.

CARBURETOR.

Application filed March 10, 1922. Serial No. 542,570.

This invention relates to carburetors.

An object of this invention is to provide a carburetor for explosive engines for automobiles and the like, for the use of gasoline, and kindred fuels, wherein the supply of the fuel and the intermixing of air with the fuel is effected in an improved manner, to provide for increased range of flexibility of operation.

Another object of the invention is the provision of a continuous supply of the vapor of gasoline or the like to a mixing chamber and the supply in such mixing chamber of air in regulated proportion.

A further object of the invention is the provision of an intermixing chamber provided with a needle valve or the like and coordinated with a float chamber, such needle valve embodying a valve seat mounted for adjustment relative to the level of the float chamber and means extending exteriorly of the mixing chamber for setting the valve at a desired adjusted position, combined with suitable means extending exteriorly of the mixing chamber for adjusting and setting the needle or like element of the needle valve.

Pursuant to a preferred form of my invention, I arrange a float chamber connected by a suitable piping with the supply tank, such float chamber being provided with a float for automatically regulating the inflow of the gasoline or like fuel to maintain a predetermined level within the float chamber, a primary mixing chamber provided with an inlet for the supply of air, such primary mixing chamber being provided with a needle valve, the seat member of which communicates with the float chamber, the valve seat member being adjustably positioned within the mixing chamber by suitable means extending exteriorly of the mixing chamber, whereby to regulate the position of the valve seat relative to the level of the float chamber, the needle element being adjusted by separate means disposed exteriorly of the mixing chamber; the intermixture of air and vaporized fuel is discharged through a series of restricted openings communicating with a secondary mixing chamber leading to the inlet of the engine manifold, the inlet of the secondary mixing chamber communicating by suitable piping with a suitable source of air, a valve for controlling the air supplied to the secondary mixing chamber and a regulator coacting with said series of restricted openings whereby when said last named valve is opened to greater extent a corresponding greater number of restricted openings are brought into operation and upon opening of said second-named valve to a lesser extent a corresponding lesser number of restricted openings are brought into operation.

Further features and objects of the invention will be more fully understood from the following description and the accompanying drawings, in which Fig. 1 is a diagrammatic view, showing in general the use of my carburetor with an automobile engine;

Fig. 3 is a top plan view, partly broken away through the casing of the hot air box, showing particularly the connections of the manifold with the supply of heated and cooled air;

Fig. 4 is a sectional elevation on line 4—4 of Fig. 2, on a greatly enlarged scale; and Fig. 5 is a perspective view, on an enlarged scale of the seat of the needle valve shown in Fig. 2.

Figure 1:
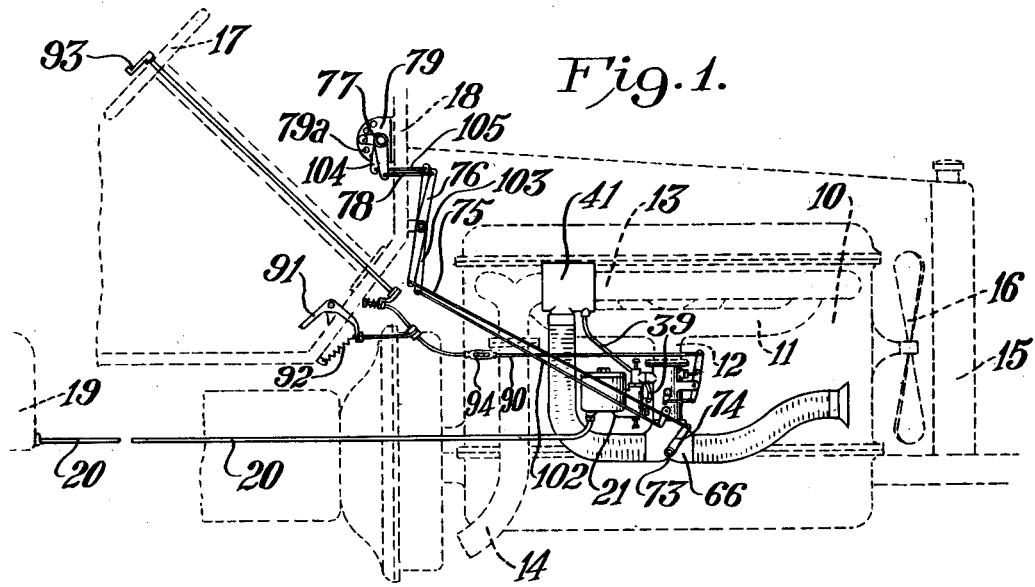

Referring to the drawings, particularly Fig. 1, the engine of the automobile is indicated at 10, which may be of any approved type. The inlet manifold of the engine is indicated at 11, the inflow opening of which is shown at 12. The exhaust outlet is shown at 13, which communicates through the pipe 14 through a muffler or the like to the atmosphere as will be understood.

The radiator of the engine 10 is shown at 15 and the fan at 16.

The steering wheel of the automobile is indicated at 17 and the dash board or cowl at 18.

The storage tank for the gasoline or like explosive forming material is indicated at 19, which may be located at the rear of the car, or under a seat of the automobile or elsewhere as desired to the rear of the dash board or cowl 18. The supply tank 19 is connected by the piping or line 20 to the carburetor 21, which pursuant to my invention is located closely adjacent the engine 10.

Figure 2:
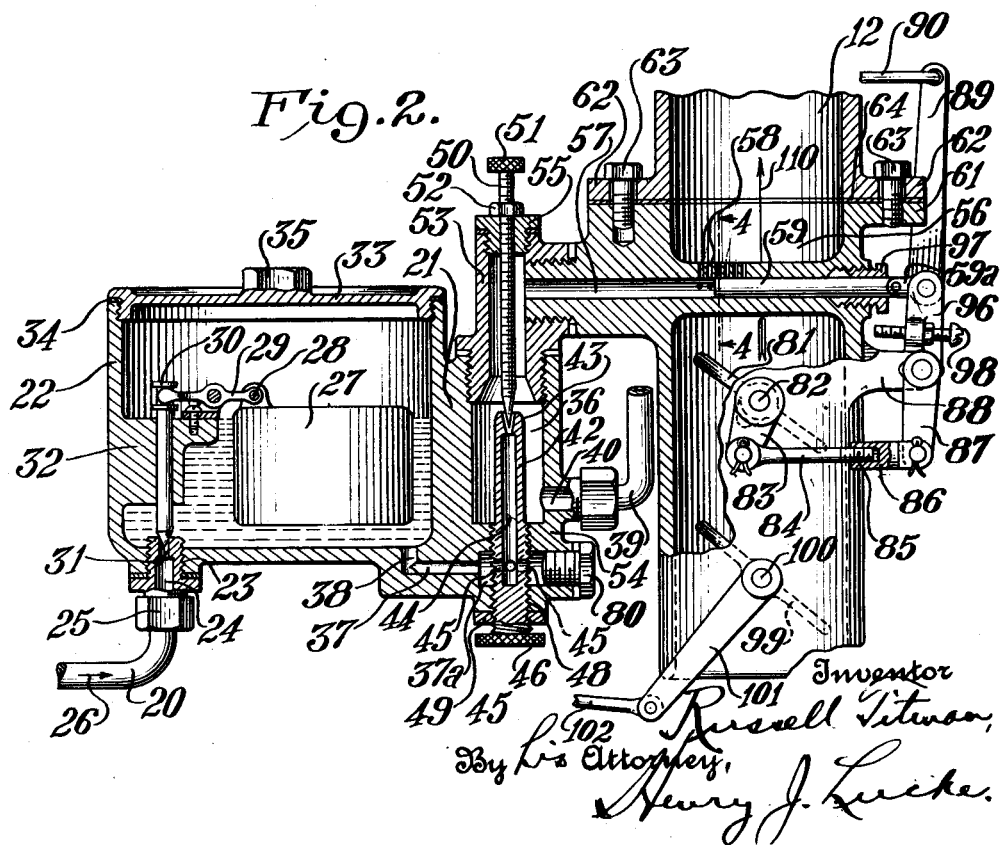
Fig. 2 is a vertical central sectional elevation through the float chamber, mixing chamber and manifold inlet, of the embodiment shown in Fig. 1, on an enlarged scale.

Referring to Fig. 2, the carburetor 21 comprises the float chamber 22 having the inlet 23 at or adjacent its bottom and suitably connected by means of the nipple 24 and nut joint 25 to the line 20 for the inflow of the gasoline or the like as is indicated by the arrow 26. Within the float chamber 22 is located the float 27 of any approved form, pivoted at 28 to the lever 29 controlling the movable valve member 30, in turn controlling the inflow of the gasoline or the like through the opening 31 of the inflow nipple 24. The lever 29 may be pivotally carried on the extension 32, which may be cast as a web within the interior and integral with the wall of the float chamber 22. The float chamber 22 is provided with the cap 33 screw-threaded to the top of the float chamber 22 and making a seal therewith as by means of the gasket ring 34. The cap 33 may be provided with the wrench head 35 for facilitating positioning and removal of the cap 33.

The primary mixing chamber is indicated at 36 which communicates through the passage 37 with the outlet 38 of the float chamber 22 for the supply of gasoline or the like. The supply of air to the mixing chamber 36 is afforded by means of the piping 39 leading to the air inlet 40 of the mixing chamber 36.

The air piping 39, as indicated in Figs. 2 and 3, is connected with the hot air box 41 located in heated relation with the exhaust 13 of the engine or in similar heated relation with any other suitable heating means.

Preferably, the supply of gasoline or the like to the mixing chamber 36 is attained by means controlling the inflow of the gasoline into the mixing chamber 36 adjustable relative to the level of the gasoline in the float chamber 22 regulated by the float 27. As a preferred form of such control of the gasoline, I have illustrated the valve embodying the hollow valve seat member 42 having (see also Fig. 5), the upper seat 43, the central passage 44 and the lower set of openings 45 distributed in spaced relation about the periphery of the valve member 42 for communication with the passage 37 for the inflow of the gasoline or the like, the lower portion of the exterior of the valve member 42 is threaded, as is indicated at 47 and further provided with a knurled head 46 for attaining varying positions of setting of the valve member 42 within the mixing chamber 36. To facilitate inflow of the gasoline from the passage 37 to the valve seat passage 44, I provide the enlarged basin 37ª and the region of the valve seat member adjacent the openings 45 is grooved as is indicated in Fig. 5 at 45ª, thereby providing under action of gravity a continuous and ample supply of gasoline within the valve seat member for the full range of adjustment of the valve seat member, a wire mesh filter may be located about the groove 45ª and the plug 80 is provided for draining the collected sediment.

The valve seat member 42 extends exteriorly of the mixing chamber 36 and is provided with the knurled head 46. Preferably, the valve seat member 42 is adjusted by screw-threaded relation with the bottom wall of the mixing chamber 36.

The valve seat member 42 is locked in any adjusted position by means of the lock nut 49, see Fig. 2.

The needle member 50 extends exteriorly of the mixing chamber 36 and is provided with the knurled head 51 and is locked by the locking nut 52.

For simplicity of assembly and disassembly, the needle member 50 may be mounted within the upper sleeve portion 53, screw-threaded to the base portion 54 of the mixing chamber 36, the needle valve 50 passing through the cap 55 of the sleeve portion 53.

As will be more fully set forth hereinafter, the mixing chamber 36 provides for the primary or anterior mixing of gasoline or the like with air to form a relatively rich mixture of explosive composition. Such rich explosive mixture is conducted to the posterior or secondary mixing passage 56, see Figs. 2, 3 and 4. The relatively rich gaseous mixture is discharged from the primary mixing chamber 36 through the pipe 57 leading to the set of spray nozzles 58 controlled by the nozzle plunger 59 operated by the accelerator or the like, as will be more specifically described hereinafter. The number of spray nozzles 58 made operative preferably increases upon increased opening-up movement of the plunger 59, and as one example of such arrangement, the nozzles may be in the order of one, two, three, four and so on for the successive sets. The nozzles 58 may be arranged in staggered relation, if desired. As is indicated in Fig. 4, each set of spray nozzles 58 comprises one or more perforations of restricted dimension which may be arranged radially through the tube terminal portion 60 of the passage 57, whereby the rich explosive mixture discharged through one or more sets of such series of discharge nozzles 58 is directed through a relatively wide region or regions within the secondary mixing chamber 56.

The secondary mixing chamber 56 is secured directly to the inlet 12 of the manifold 11 of the engine 10, as by means of the concentric web flange 61 abutting the flange 62 of the manifold inlet 12 and locked therewith by means of the set-bolts 63 and sealed by means of a gasket 64 if desired.

The secondary mixing chamber 56 communicates at its inlet 65 with the T-nipple 66, connecting at its one opening 67 through the flexible piping 68 with the heater 41 and at its other opening 69 through the flexible piping 70 with the inlet 71 located closely adjacent to the rear of the fan 16.

Within the T-nipple 66 is disposed the pivoted valve member 72 attached to the stud 73 extending exteriorly of the T-nipple 66, see Fig. 1, to which stud is secured the arm 74 connected by the link 75 to the lever 76, regulated in any manner as by the manual setting lever 77 connected to the lever 76 by means of the link 78. The manual lever 77 is preferably located on the cowl 18 and is set in any desired position by means of the series of perforations 79ª in plate 79. By such means, the valve 72 may be positioned as is indicated in Fig. 3, to exclude heated air into the inlet 65 of the secondary mixing chamber 56 and to admit solely air relatively cool and supplied under pressure by the fan 16 into the inlet 71. Or, the valve 72 may be set in its other extreme position to admit solely heated air supplied from the heater 41; or the valve 72 may be set for any desired intermediate position admitting both heated, and cooled and compressed air in relative proportions as may be desired.

Within the inflow portion 65 of the secondary mixing chamber 56, I provide the valve 81, of the butterfly or other approved type, having the stud 82 which is attached to the arm 83. To the arm 83 is connected the link 84, adjustable in length by the provision of the screw-threaded telescoping parts 85, 86, the part 86 being pivoted to the lower lever arm 87, pivotally mounted on the bracket 88 or otherwise. The upper lever arm 89 is connected by the rod 90, see Figs. 3 and 1, to the accelerator 91, having the retractile spring 92; the rod 90 also connects the lever 87—89 with the manual gas lever 93 located adjacent the steering wheel 17. Upon depression of the accelerator 91, and similarly upon advanced movement of the manual gas lever 93, the rod 90 is moved to the right, as viewed in Fig. 1, thereby increasing the effective opening between the valve 81 and the wall of the inlet compartment 65 of the secondary mixing chamber 56.

The rod 90 is preferably adjustable in effective length by means of the turnbuckle 94, or the like.

Co-ordinated with the lever 89—87 is arranged the lever arm 96, see Figs. 2 and 3, to which the nozzle plunger 59 is connected by a knuckle joint 59ª. The lever arm 96 may be formed integral with the lever arms 89—87 as shown and the unitary three arm lever pivoted on the bracket 88, as indicated.

The plunger 59 passes through the stuffing box of the screw-threaded cap 97 closing the exterior opening of the passage 57.

It will be noted that the valve 81 and the nozzle plunger 59 are so assembled that upon increase of opening of the valve 81, in clockwise direction as viewed in Fig. 2, the nozzle plunger 59 is moved outwardly to thereby further uncover a larger number of discharge openings 58 and upon movement of the valve 81 in the opposite direction, i. e., counterclockwise as viewed in Fig. 2, to thereby restrict the amount of air passing through the inflow 65 of the secondary mixing chamber 56, the nozzle plunger 59 is moved inwardly to thereby cover and close more and more of the discharge openings 58.

The set screw 98 is provided for adjusting the inward limiting extent of movement of the lever 96. By means of the adjustable parts 85, 86, the setting of the valve 81 relative to the nozzle plunger 59 is regulated.

Preferably, I provide in the inlet 65 of the secondary mixing chamber 56 the anterior valve 99, Figs. 2, and 3, having the stud 100 to which is secured the arm 101 connected by the link 102 to the lever 103 mounted on the cowl 18 and controlled by the manual setting member 104 by means of the link 105. Such valve 99 serves to control the maximum amount of heated or cooled air entering the inflow 65 of the secondary mixing chamber 56.

In the circumstances of first starting the engine, the valve 99 is set by its manipulating element 104 to substantially closing position, whereby upon operating the electric starter or by cranking, the entire "suction" of the engine is effected through the primary mixing chamber 36 whereby the rich mixture of air and gasoline is transmitted through the discharge openings 58 uncovered by the accelerator 91, or manual gas lever 93, and such concentrated vapor delivered through the inlet manifold 11 to the various engine cylinders as required, thus providing a highly rich initial explosive charge for the engine and thereby facilitating instant actuation of the engine under its own operation. This action is facilitated by the location of the primary mixing chamber closely adjacent the engine inlet manifold. Upon starting of the engine under its own power, the valve 99 is opened by setting of its manipulating element 104, whereafter the supply of air to the inlet 65 of the secondary mixing chamber 56 takes place automatically as set forth hereinabove.

Whereas I have described my invention by reference to specific forms thereof, it will be understood that many changes and modifications may be made without departing from the spirit of the invention, as defined by the appended claims.

I claim:

1. A carburetor comprising a mixing chamber having a perforated bottom and a lateral wall portion provided with an air inlet, a fuel passage member disposed in said perforation and extending upwardly within said mixing chamber, said fuel passage member being provided with an orifice disposed within said mixing chamber, an adjustable needle valve cooperating with said orifice, a second mixing chamber, adjustable passage means connecting an upper portion of said first-named mixing chamber with said second-named mixing chamber, said adjustable passage means comprising an element provided with a passage opening extending longitudinally thereof and further comprising a plurality of relatively smaller openings extending from said passage opening into said second-named mixing chamber and a plunger disposed within said passage opening for controlling the extent of effective communication of said relatively smaller openings with said passage opening, and adjustable means for regulating the proportion of air supplied to said second-named mixing chamber.

2. A carburetor comprising a mixing chamber having a perforated bottom and a lateral wall portion provided with an air inlet, a fuel passage member disposed in said perforation and extending upwardly within said mixing chamber, said fuel passage member being provided with an orifice disposed within said mixing chamber, an adjustable needle valve cooperating with said orifice, a second mixing chamber disposed posterior to said first-named mixing chamber, adjustable passage means connecting an upper portion of said first-named mixing chamber with said second-named mixing chamber, said adjustable passage means comprising an element provided with a passage opening extending longitudinally thereof and further comprising a plurality of relatively smaller openings extending from said passage opening into said second-named mixing chamber, a plunger disposed within said passage opening for controlling the extent of effective communication of said relatively smaller openings with said passage opening, and adjustable means for regulating the proportion of air supplied to said second-named mixing chamber, and a connection between said adjustable means and the plunger whereby the plunger is positioned in accordance with positioning of said adjustable means.

In testimony whereof I have signed this specification this 1st day of March, 1922.

RUSSELL TITMAN.